though it had been separated from methylacetate and water.

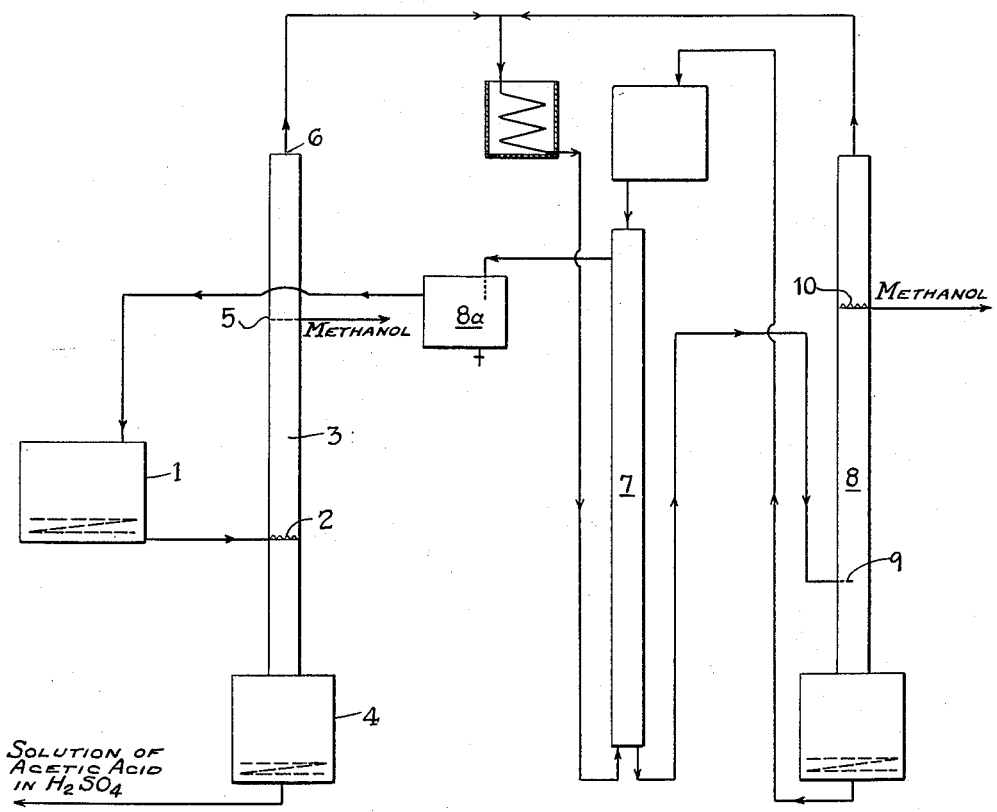

United States Patent Office 2,866,820
Patented Dec. 30, 1958

2,866,820

PRODUCING METHANOL AND ACETIC ACID FROM SAPONIFICATION MIXTURES OF METHYLACETATE

Hans Anselm, Grafelfing vor Munich, Alfons Kofler, Munich-Pasing, and Jürgen Smidt, Munich-Solln, Germany, assignors to Consortium für Elektrochemische Industrie G. m. b. H., Munich, Germany, a German firm Application April 25, 1956, Serial No. 580,605

2 Claims. (Cl. 260—541)

The saponification of carboxylic acid esters with aqueous alkalis is complete and affords direct production of an alcohol free from ester. However, the carboxylic acid is obtained as an alkali salt from which it must be set free by means of an inorganic acid. The great consumption of alkali and mineral acid makes this process very expensive.

The saponification of carboxylic acid esters in the presence of water and acid catalysts, as cation exchangers or aqueous mineral acids, is not complete. An equilibrium appears which depends essentially on the molar ratio ester: water; to some extent it depends also on the temperature of the saponification liquid. The following table shows values at which there is equilibrium when saponifying methylacetate with an aqueous mineral acid at a temperature of 40° C.:

| Molar ration, water:ester | Saponification, percent | Percent acetic acid based on water |
|---|---|---|
| 2 | 40.0 | 47.0 |
| 4 | 53.0 | 33.0 |
| 6 | 61.5 | 27.0 |
| 8 | 66.0 | 22.5 |
| 10 | 70.0 | 20.0 |

The temperature has the following effect on the equilibrium: All other conditions being the same saponification of methylacetate is about 10% greater at 60° C. and 15% greater at 98° than at 17° C.

The above shows that the acetic acid must be diluted with water in order to obtain a total saponification of methylacetate. As it is desired to recover the acetic acid in concentrated form and concentration is more costly the more the acetic acid is diluted, usually not more water is used than corresponds to a 25% acetic acid.

It is not possible to completely recover the methanol and acetic acid contained in the saponification reaction mixture by conventional fractionation. Whereas the equilibrium moves towards increased saponification when heating the saponification mixture, the methanol and the acetic acid are reesterified from the beginning of the distillation because unchanged ester is removed from the equilibrium mixture. If distillation is performed in the presence of the saponification catalyst, about 90% more ester is obtained in the distillate, in the case of methylacetate, than was previously present in the equilibrium mixture. If the catalyst is inactivated, for example, by neutralization of the mineral acid, only 20% new methylacetate is formed. The saponification of the methylacetate is reduced in the first case, for example, from 61.5 to 32.3%, and in the second case to 51.1%.

Production of methanol from the saponification mixture is difficult because the alcohol forms with the respective ester a binary mixture composed of 19.5% methanol and 81.5% methylacetate which mixture is constantly boiling at 54° C.

Separation of the alcohol by fractionation of the saponification mixture is impaired because 100 parts of unsaponified ester take along 23.9 parts of methanol into the azeotropic distillate.

Therefore, only the excess alcohol can be obtained by the distillation of the saponification mixture. For example, at a saponification yield of 61.5%, 26.6 parts methanol are formed from 100 parts ester by acid saponification of the methylacetate. The 38.5 parts of unsaponified ester take along 9.2 parts methanol into the binary mixture so that 17.4 parts methanol or 65.4% can be directly obtained by the fractionation.

The yield of alcohol is much reduced, as explained above, by batch fractionation of the saponification mixture, particularly in the presence of the saponification catalyst. In the case of methylacetate the amount of ester is so much increased, due to the reesterification, that the methanol is completely distilled in the binary mixture and no methanol fraction is produced.

We have found a process which makes possible the production of methanol and acetic acid from saponification mixtures of methylacetate in a simple and economical manner. The process essentially consists in continuously conducting the saponification mixture obtained in the presence of water and acid catalysts preferably after reaching a saponification ratio which is preponderantly on the saponification side at a temperature close to the boiling point, to the distributor tray of a thru-flow column apparatus whereby the temperature of the tray is maintained below the boiling point of water. The alcohol which is in excess of the azeotropic ratio is removed from the column above the distributor tray. The methanol is extracted from the binary mixture obtained as distillate at the head of the column by means of a highly concentrated aqueous salt solution, the alcohol being distilled from the salt solution. The ester is reintroduced into the saponification mixture after a short period of clearing. The acetic acid is obtained in the conventional manner, for example, by extraction from the aqueous solution in the still of the thru-flow column.

It is also possible to flow the entire methanol together with the unchanged methylacetate into a second column and to separate it therein into binary mixture and methanol.

The temperature of the distributor tray should be below 100° C. in order to prevent distillation of acid containing water. Under these conditions the alcohol is so quickly separated from the carboxylic acid that a change of the equilibrium in the sense of a reesterification, as is experienced, particularly with batch fractionation, even at the presence of the catalyst, does not occur.

The separation of the binary mixture in methanol and methylacetate by extraction is effected with highly concentrated aqueous solutions of organic and inorganic salts which are not separated by the extraction and in which the ester is little soluble and the alcohol is well soluble, for example, potassium formate, potassium acetate, sodium propionate, sodium chlorate, calcium chloride, sodium lactate, potassium phenolate, sodium acetate, magnesium acetate, potassium propionate, magnesium propionate, and mixtures of these salts. Fractionation yields the bulk of the methanol free from methylacetate from the salt solution containing alcohol, aside from a small amount of an alcohol-ester mixture. The salt solution is returned to the extraction. The methylacetate obtained by the extraction as the specifically lighter phase contains about 0.5% methanol and 0.5% water and traces only of the salt solution after a short time of clearing. The methylacetate is again saponified at best possible efficiency because the saponification is practically not impaired by the very small methanol content.

The extraction with the salt solution is usually effected when the azeotropic mixture is liquid, though extraction of the mixture in vapor state is not excluded from the scope of the invention. In the first case the extraction is performed in a counterflow extraction, in the second case it is performed in a distilling column.

By the combination according to the invention of the continuous distillation of the saponification mixture with the extraction of the constantly boiling binary mixture with a highly concentrated aqueous salt solution an economic decomposition of the methylacetate in acetic acid and methanol is possible whereby both materials are obtained in pure form. At a single passage of the ester the decomposition is obtained at great efficiency. The yield of methanol and acetic acid is practically quantitative. The auxiliary materials, as mineral acid, acid ion exchanger, and salts can be reused without noteworthy loss.

The accompanying drawing diagrammatically illustrates an apparatus for performing the method according to the invention. The apparatus will be explained in conjunction with the following examples, which are included as a part of this specification for the purposes of explanation and without limitation of the invention.

*Examples*

100 kilograms methylacetate were heated in a container 1 to 60° C. to 70° C. with 150 kilograms 3% sulfuric acid. The mixture became homogeneous within a short time and after 1½ hours 38.5 kilograms methylacetate, 26.6 kilograms methanol, and 49.4 kilograms acetic acid were in the mixture. This composition which corresponds to the saponification equilibrium was not changed by further heating. The composition corresponds to a 61.5% saponification of the methylacetate. The mixture was continuously conducted to the distributor tray 2 of a thru-flow column 3 at 65° C. to 70° C. The temperature of the distributor tray was maintained at 95° C. by heating the content of the still 4.

A solution of 49.4 kilograms acetic acid in 150 kilograms 3% sulfuric acid was obtained from the still 4. The solution was extracted by conventional methods, for example, with tributyl phosphate for obtaining the acetic acid. The remaining 3% sulfuric acid was returned to the saponification. 18.1 kilograms methanol were removed from a tray 5 of the thru-flow column at 64° C. A mixture of 38.5 kilograms methylacetate and 8.5 kilograms methanol constantly boiling at 54° C. was distilled from the head 6 of the column 3.

This mixture was conducted at 30° C. into the bottom of an extraction tower 7 containing filler elements. 75 liters of a 72% potassium acetate solution were admitted to the top of the tower 7 to flow counter to the mixture of methylacetate and methanol. 34.2 kilograms 99% methylacetate were obtained in the upper part of the extraction tower and were conducted through an interposed storage vessel 8a into the saponification container 1. The potassium acetate solution leaving the bottom of the tower 7 was conducted at 9 into a thru-flow column 8 where it was separated into 4.6 kilograms methylacetate as a distillate and 1 kilogram methanol as binary mixture which was returned to the extraction. At a tray 10 7.5 kilograms methanol were obtained at 64° C. A 72% potassium acetate solution was obtained in the still of the column 8 and returned to the extraction. Of the 26.6 kilograms methanol produced by the saponification 25.6 kilograms are recovered in one passage.

Use of a 73% potassium formate solution, which is neutral with respect to phenolphthalein, for the extraction of the binary mixture permitted a volumetric ratio of 1 (binary mixture):1.5 (potassiumformate solution) at 20° C. for the counterflow extraction. The produced ester layer contained 98% to 99% methylacetate after clearing and the extract layer contained 7% methanol and 0.6% methylacetate.

When using a salt solution formed by a mixture of 90 parts by weight 74% potassium acetate and 10 parts by weight 74% sodium lactate solution the counterflow extraction was performed at 40° C. and at a volumetric ratio of 1 (binary mixture):1 (salt solution mixture). The yield was substantially the same as that of the extraction with the 72% potassium acetate solution. The use of the salt mixture has the advantage that its freezing point is lower, i. e. at about 7° C. below zero °C.

As a modification of the process a 33% calcium-chloride solution was used for the extraction, the volumetric ratio of the binary mixture with respect to the salt solution was 1:1 and the temperature was 20° C. The extract contained 6.9 times more methylalcohol than the ester layer, i. e. 87.3% of the total methylalcohol.

As an other modification 1 volume of the binary mixture is extracted with 1.5 volumes of a 32% sodium acetate solution or of a 38% magnesium acetate solution. The extract contained 3.1–3.2 times more methylalcohol than the ester layer.

Use of a 65% potassium propionate solution for the extraction of the binary mixture permitted a volumetric ratio of 1 (binary mixture):1 (potassium propionate solution) at 20° C. for the counterflow extraction. The produced ester layer contained 99% methylacetate, 0.5% methylalcohol and 0.5% water. The extract contained 99% of the total methylalcohol.

What is claimed is:

1. In a process for the production of methanol and acetic acid from reaction mixtures obtained on saponification of methylacetate with water in the presence of acid catalysts, the steps which comprise heating the saponification reaction mixture to substantially its boiling point and continuously conducting the heated mixture to the distributor tray of a thru-flow column, maintaining the temperature on the distributor tray from 95° C. to below the boiling point of water, removing that portion of the methanol in the reaction mixture introduced into the column which is in excess of that required to form a binary methanol-methylacetate azeotrope with the methylacetate present distilling off said methylacetate at the head of the column as a binary methanol-methylacetate azeotrope containing the remaining methanol, condensing said binary azeotrope and separating the methyl alcohol therefrom by continuously countercurrently extracting said binary methanol-methylacetate azeotrope with a highly concentrated aqueous salt solution, distilling the methyl alcohol from said salt solution, returning the methyl acetate remaining after said extraction to the saponification reaction, and extracting the acetic acid formed by said saponification from the aqueous solution accumulating in the still at the base of the column.

2. A process according to claim 1 in which the salts for said salt solution are taken from the group consisting of potassium formate, potassium acetate, sodium propionate, sodium chlorate, calcium chloride, sodium lactate, potassium phenolate, and mixtures of these salts.

References Cited in the file of this patent

UNITED STATES PATENTS 2,650,249  Mention et al. _____ Aug. 25, 1953

OTHER REFERENCES

Weissberger: Technique of Organic Chemistry, vol. III (1950), pp. 298 to 301.
Weissberger: Technique of Organic Chemistry, vol. IV, 1951, pp. 366–367.